Patented Feb. 11, 1930

1,746,984

UNITED STATES PATENT OFFICE

WILLIAM C. BAUSCH, OF CHICAGO, ILLINOIS

VEHICLE FOR ACETYL-SALICYLIC ACID TABLETS

No Drawing.    Application filed October 31, 1927. Serial No. 230,189.

The object of my invention is the production of a medicinal compound consisting of acetyl-salicylic acid and stearic acid, in tablet form, that increases the rate of absorption of acetyl-salicylic acid in the proximal part of the gastrointestinal tract, the normal site for the absorption of salicylates; also prevents the splitting of acetyl-salicylic acid in the stomach by free hydrochloric acid, and also allows the production of a firm tablet, preventing crumbling, but without decreasing its absorbability.

These improvements in the medicinal use of acetyl-salicylic acid are accomplished as described below, and the rationale for making these improvements is based on the following premises:

1. Salicylates are absorbed in the duodenum and jejunum after chemical reactions occur due to the activity of the succus entericus and of bile. It is, therefore, not necessary that acetyl-salicylic acid be acted on by gastric juice in order that it be absorbed.

2. One of the untoward results of administering salicylates by mouth is that free salicylic acid is frequently formed in the stomach due to the action of the gastric juice, and this free salicylic acid is irritating to the lining of the stomach, causing gastric symptoms such as heart burn, epigastric distress, retching and vomiting, frequently associated with excessive production of gastric juice (watery secretion), acetyl-salicylic acid was compounded originally to overcome gastric irritation accompanying the administration of salicylates, it being claimed that this compound was not destroyed in the stomach. It can be easily demonstrated that acetyl-salicylic acid may be broken down in gastric juice with the liberation of free salicylic acid, by placing tablets of acetyl-salicylic acid in gastric juice aspirated by stomach tube after an Ewald test meal. If acetyl-salicylic acid is incubated in this gastric juice at 37° C. (approximately body temperature) free salicylic acid can be demonstrated in the gastric juice by the use of the Gerhardt test (ferric chloride solution). This splitting of acetyl-salicylic acid by gastric juice occurs most rapidly when the free hydrochloric acid is abundant, and it is very probable that individuals who suffer gastric distress after taking acetyl-salicylic acid do so because of hyperacidity, which allows free salicylic acid to form and irritate the lining of the stomach.

3. It would, therefore, be advantageous to carry the acetyl-salicylic acid tablet through the stomach in some way without it being attacked by free hydrochloric acid. This is accomplished by my compound because the stearic acid, acting as a binder for the tablet, is not destroyed by gastric juice as are most of the water soluble binders now in use in making tablets. Therefore, the particles of the tablets broken up by chewing the tablet in the mouth are carried almost intact into the small bowel, with only minimal exposure of the drug to the action of gastric juice.

4. When the tablet arrives in the duodenum, the fat-splitting enzymes, together with the bile, destroy the binding stearic acid so that the tablet crumbles and the succus entericus allowed to attack the particles of acetyl-salicylic acid so that products are formed from this interaction that may be absorbed into the wall of the bowel. It appears to us from experiments that stearic acid is a cholegogue in many individuals and that the succus entericus contains larger quantities of steapsin after the administration of acetyl-salicylic acid and stearic acid than when acetyl-salicylic acid is administered alone. This probably explains that the analgesic effects of my compound of acetyl-salicylic acid and stearic acid are experienced by individuals as soon as when acetyl-salicylic acid is taken in powder form, and sooner than when it is taken in the ordinary tablet form, and much more rapidly than when it is taken in a keratinized tablet or pill, or formalized gelatin capsule.

Further, the use of stearic acid as a binder in the formation of a tablet of acetyl-salicylic acid, according to my prescription, allows the production of a firmer tablet without loss of efficacy, and, therefore, eliminates considerable loss from crumbling of tablets as now frequently occurs.

What I claim as new and desire to secure by Letters Patent of the United States, is,

1. A medicinal compound formed into a tablet consisting of acetyl-salicylic acid mixed with stearic acid, the stearic acid functioning as a binder for the tablet, and as a protectant of the acetyl-salicylic acid against action in the mouth, esophagus and stomach.

2. A medicinal compound formed into a tablet consisting of acetyl-salicylic acid and stearic acid in proportions of 4 to 1 or 3 to 1, respectively, thoroughly mixed, the stearic acid being used as a binder for the tablet, as a protectant of the acetyl-salicylic acid against the action of gastric juice, and as an accelerator of the absorption of acetyl-salicylic acid from the upper portion of the small bowel.

3. A medicinal compound consisting of 4 to 5 grains of acetyl-salicylic acid and 1 to 2½ grains of stearic acid thoroughly mixed and formed into a tablet, the stearic acid being used in varying proportion depending on the hardness desired, the stearic acid when thoroughly mixed with acetyl-salicylic acid acting as a binder for the tablet and also when thoroughly mixed permitting immediate disintegration when it arrives in the duodenum, and the stearic acid also acting as an accelerator of the absorption of acetyl-salicylic acid into the wall of the small bowel.

In testimony whereof I have fixed my hand this 28th day of October, A. D. 1927.

WILLIAM C. BAUSCH.